United States Patent
Guichon et al.

(10) Patent No.: US 8,313,679 B2
(45) Date of Patent: Nov. 20, 2012

(54) METHOD OF MAKING MOULDS FOR STUDDED TIRES

(75) Inventors: Cyril Guichon, Greer, SC (US);
Jean-Louis Cocural, Enval (FR); Bruno Martin, Combronde (FR); Jean-Luc Rieu, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 1211 days.

(21) Appl. No.: 12/148,901

(22) Filed: Apr. 23, 2008

(65) Prior Publication Data

US 2008/0277038 A1 Nov. 13, 2008

(30) Foreign Application Priority Data

Apr. 23, 2007 (FR) ..................... 07 02975

(51) Int. Cl.
*B29C 33/38* (2006.01)
*B29C 33/42* (2006.01)

(52) U.S. Cl. .............. 264/219; 29/423; 29/458; 29/557; 425/28.1

(58) Field of Classification Search .................. 264/219; 425/28.1, 46; 29/423, 458, 557
See application file for complete search history.

(56) References Cited

U.S. PATENT DOCUMENTS

| 3,327,570 A | 6/1967 | McClarran |
| 4,343,757 A * | 8/1982 | Popplewell .................... 264/317 |
| 4,471,200 A | 9/1984 | Takahashi et al. |
| 4,553,918 A | 11/1985 | Yoda et al. |
| 4,691,431 A | 9/1987 | Hayata |
| 6,533,006 B1 * | 3/2003 | Siltanen ......................... 152/210 |
| 7,900,669 B2 * | 3/2011 | Eromaki ........................ 152/210 |
| 2002/0170645 A1 * | 11/2002 | Norwood et al. ............. 156/114 |

FOREIGN PATENT DOCUMENTS

| GB | 1 075 312 | 7/1967 |
| JP | 62 094402 | 4/1987 |
| KR | 2001-0045926 A * | 6/2001 |

OTHER PUBLICATIONS

Machine translation for Korea 2001-0045926 (no date).*

* cited by examiner

*Primary Examiner* — Steven D Maki
(74) *Attorney, Agent, or Firm* — Cozen O'Connor

(57) ABSTRACT

A method for producing a mold lining (G) intended for the manufacture of tires comprising tread blocks that have incisions in them and studs. A mold lining is produced by positioning lamella ($L_1$, $L_2$, $L_3$, $L_4$, $L_5$, $L_6$) of substantially equivalent shape and length on the parts of the lining (G) that are intended to mold the rubber blocks. In a next step, the material of the lining (G) and of the lamella ($L_1$, $L_2$, $L_3$, $L_4$, $L_5$, $L_6$) contained in a cylindrical space located at each of the sites intended to accept pins capable of molding the housings for the studs is removed radially, and an insert supporting a pin is positioned in the hole obtained beforehand.

5 Claims, 5 Drawing Sheets

METHOD OF MAKING MOULDS FOR STUDDED TIRES

RELATED APPLICATIONS

This application claim the priority of French application Ser. No. 07/02975 filed Apr. 23, 2007, the content of which is hereby incorporated by reference.

FIELD OF THE INVENTION

The invention relates to the field of the manufacture of tires for land vehicles and more particularly the manufacture of tires intended to run on icy surfaces.

BACKGROUND OF THE INVENTION

The regulations applicable in certain Scandinavian countries allow the use of tires that have studs to improve the grip of the tires on frozen and particularly slippery surfaces. These studs are positioned in housings made on the tread blocks situated on the tread.

The blocks of rubber that make up the tread of these tires thus, as a general rule, include numerous transverse incisions in order to improve the grip of the tire on snowy surfaces.

The manufacture of these particular types of tire involves a first step that culminates in the production of a vulcanized tire in which the blocks have incisions and housings intended to accept the studs, and a second step during which a suitable method is used to fit the studs into the said housings.

In order not to degrade the firmness with which the head of the studs is held in its housing, the incisions are interrupted within a region, generally a circular region, lying around the housing intended to accept the stud.

To do this, the mould intended for producing these tires suited to severe winter conditions comprises lamella intended to form the incisions, and pins intended to form the housings capable of accepting the said studs.

The lamella consist of elements in the form of thin and rigid, generally metal, partitions of a height that corresponds to the depth of the incision, and of a length that corresponds to the length of the incision. These lamella may have a wavy, straight or an even more complicated shape depending on the desired type of use. The lamella are positioned projecting in the part of the mould intended to give the tread its definitive shape, and which forms the mould lining.

The pins have the overall shape of that part of the stud which is inserted in the housing, and are embedded in the block of rubber at a predetermined point dependent on the noise and grip criteria defined by the tire designer.

If the shape of the former used to mould a tread block and as illustrated in FIGS. 1 and 2 is examined more closely, it may be seen that the lamella are interrupted around the region situated a given distance away from the centre of the pin. The lamella $L_1$ and $L_6$ run the entire width of the tread block. By contrast, the lamella in rows 2, 3, 4 and 5 are formed of two aligned lamella positioned one on each side of a circle surrounding the base of the pin P. The row 2 lamella is broken down into $L_{21}$ and $L_{22}$, the row 3 lamella is broken down into $L_{31}$ and $L_{32}$, the row 4 lamella is broken down into $L_{41}$ and $L_{42}$ and the row 5 lamella is broken down into $L_{51}$ and $L_{52}$. In addition, it can be seen that lamella $L_{21}$, $L_{22}$, $L_{31}$, $L_{32}$, $L_{41}$, $L_{42}$; $L_{51}$ and $L_{52}$ have different lengths according to the position they occupy about the space formed by the circle surrounding the pin P as can be seen in FIG. 2, which is a view from above of the lining element G shown in FIG. 1.

It then follows that the manufacture of a lining of this type entails the production of a great many different lamella the lengths of which are tailored to suit the positions that the pins occupy on the tread block element It will be noted too that the pin P may also be situated at very varying points across the tread block as is shown in FIG. 3. On the basis of this example it is found that the lamella element $L_{31}$ in FIG. 3 is far shorter than the lamella element $L_{31}$ illustrated in FIG. 2. That increases the variety of lamella that have to be produced and fitted into the mould lining accordingly.

Finally, determining the final position that the pin will occupy on the block of rubber may be done at a late stage in the development of the tire because of the numerous optimization loops that are needed when seeking out the best grip/noise compromise.

All of the foregoing means that this approach has a serious impact on the cost of such a lining.

SUMMARY OF THE INVENTION

It is an object of the invention to reduce the complexity of the manufacture of linings comprising lamella intended for moulding the incisions made in the block of rubber, and pins intended to mould the housings that accept the studs.

Publication U.S. Pat. No. 3,327,570 describes a method of drilling a mould lining. However, implementing this method entails removing the lamella beforehand from the region in which the drilling is to be made in order to get around the problem associated with simultaneously drilling the lining and the lamella. The problem is that the lamella are in the form of very thin strips of metal that it is difficult to drill in a direction parallel to the plane of the strips because of vibrations of the metal strip and deformation of the strips under the action of the drill bit. It is an object of the invention to provide a solution to this problem of drilling the lamella.

One aspect of the invention is directed to a method for producing a mould lining intended for the manufacture of tires comprising tread blocks in which incisions are made and which, as a general rule, support studs. The method comprises a first step during which a mould lining is produced in the traditional way by positioning lamella of substantially equivalent shape and length on the parts of the lining that are intended to mould the said rubber blocks.

This first step is followed by a second step during which:

the material of the lining and of the lamella contained in a cylindrical space located at each of the sites intended to accept pins capable of moulding the housings for the said studs is removed radially by drilling, before drilling is performed, a meltable material (T) that will be melted after the said drilling operation has been performed, is poured between the lamella positioned on the interior side of the lining and at the point where the drilling is to be made, and an insert is positioned in the hole obtained beforehand.

By keeping the lamella firmly gripped in a rigid material the problem associated with drilling the lamella is eliminated.

Advantageously, drilling may be done from the outside of the lining towards the inside of the lining thus improving the precision and quality of the drilling.

As a general rule, the insert comprises a pin intended to mould the housing capable of accepting the said stud, even though the method according to the invention is not restricted to the manufacture of just this type of mould and can be extended to the manufacture of any type of mould comprising an insert.

In this way, there is no longer any need to determine the length of the lamella in advance according to the site of the pin, given that the material of the lamella situated in the region of given diameter surrounding the pin is removed during the same operation in which the lining is drilled in order to open up the space intended to accept the insert supporting the pin.

It is then possible to produce lamella of substantially equivalent lengths and thus considerably reduce the number of lamella of different lengths to be produced and to be fitted because, going back to the example of the preceding paragraphs as illustrated by FIGS. 1 and 2, the rows 2, 3, 4 and 5 lamella are substantially the same length as the rows 1 and 6 lamella, unlike in the method of the prior art in which it was necessary to produce and to fit twice as many lamella, namely the lamella $L_{21}, L_{22}, L_{31}, L_{32}, L_{41}, L_{42}; L_{51}$ and $L_{52}$.

DETAILED DESCRIPTION OF THE DRAWINGS

Figure 1:
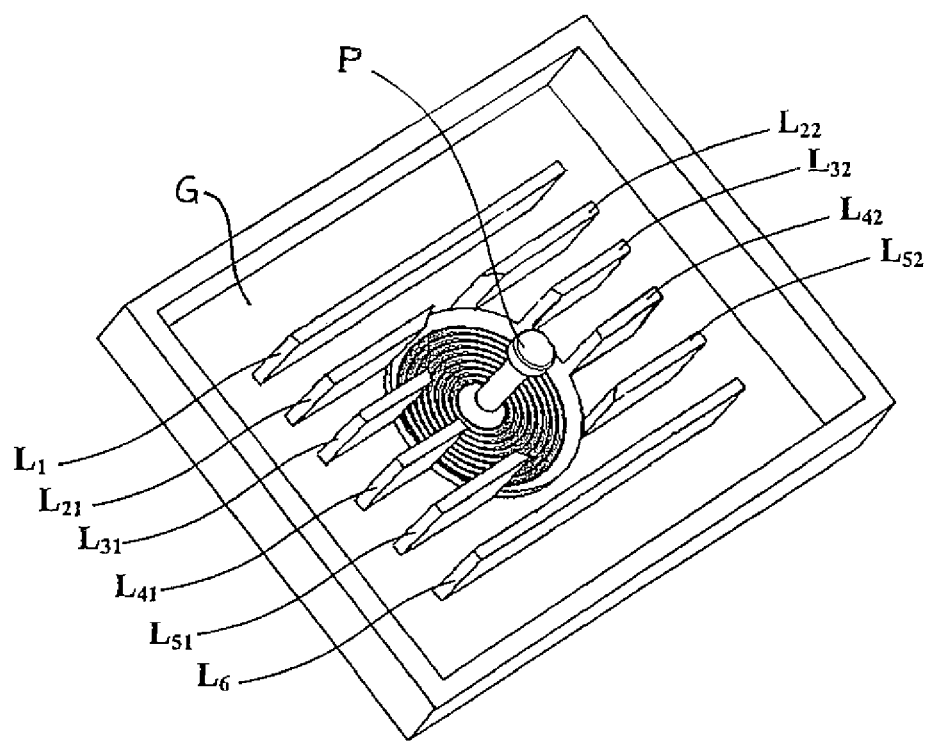
FIG. 1 depicts a schematic view of part of a lining comprising lamella and a pin and intended to mould a block of rubber comprising incisions and a stud.

The end result to be achieved according to the method in accordance with an embodiment of the invention is the same as that illustrated in FIG. 1, namely a lining G comprising lamella and a pin P.

To achieve this result, the method goes through the following steps.

Figure 4:
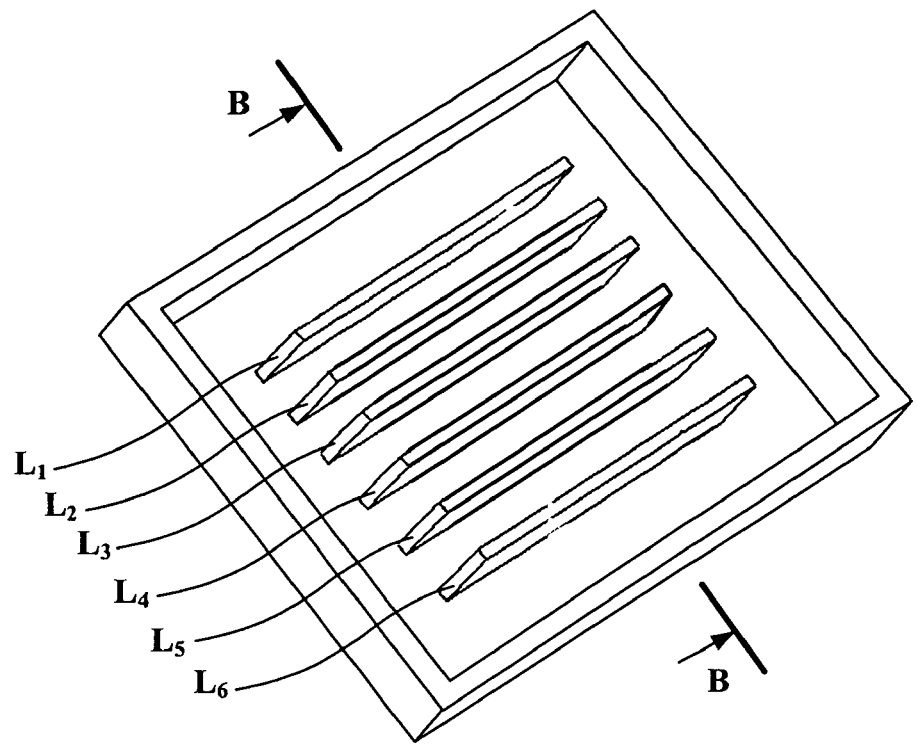
FIG. 4 depicts a schematic view of part of a lining comprising lamella of substantially equal lengths.

A lining G is produced of which a part, corresponding to a block of rubber, is illustrated in FIG. 4. It will be noted that the lamella $L_1, L_2, L_3, L_4, L_5$ and $L_6$ have substantially the same length λ and that this lining element G is produced without any regard for the final position of the pin P. This amounts to the production of a lining of the same kind as the mould linings intended to manufacture tires known as siped tires which have no studs.

Figure 5:
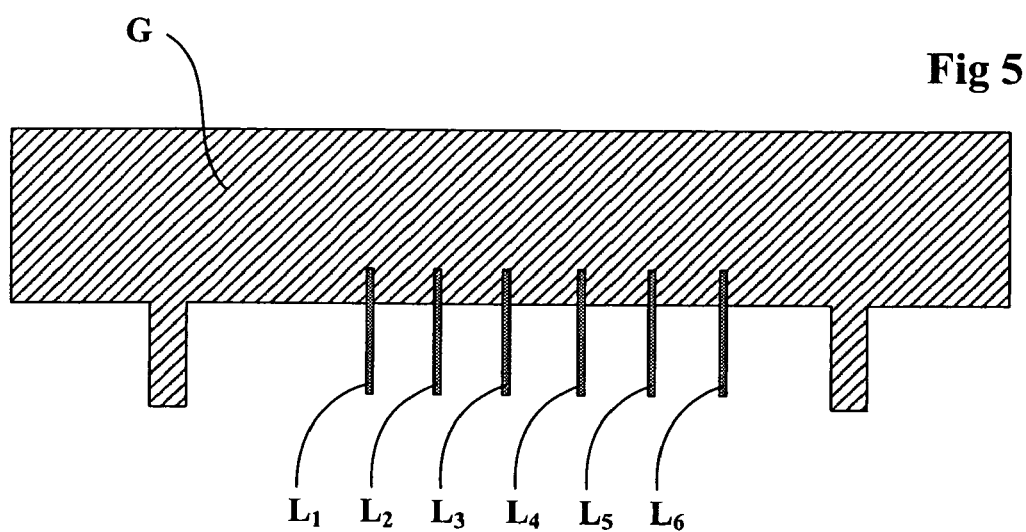
FIG. 5 depicts a schematic front view, in section on BB, of the part of the lining illustrated in FIG. 4.

FIG. 5 illustrates a view in section in a direction BB through the lining element depicted in FIG. 4. The lamella $L_1, L_2, L_3, L_4, L_5$ and $L_6$ are fitted into the lining G, and the base of each lamella is deeply embedded in the body of the lining G. The lining G is obtained in the conventional way by machining or, as a preference, by casting. In the latter instance, the material that forms the lining is a composition based on aluminium. The lamella as a general rule are made of a material based on steel, which is far harder than the material of which the lining is made.

According to the exemplary embodiment of the invention that is being discussed by this description, the choice is made to clear away the material situated in the region of the pin P by drilling using a drill F or, in an equivalent way, by milling.

It goes without saying that the general principles of the invention also apply when the drilling is made using other means such as means for removing material by electron discharge machining or by applying a laser beam, or other equivalent means.

Figure 6:
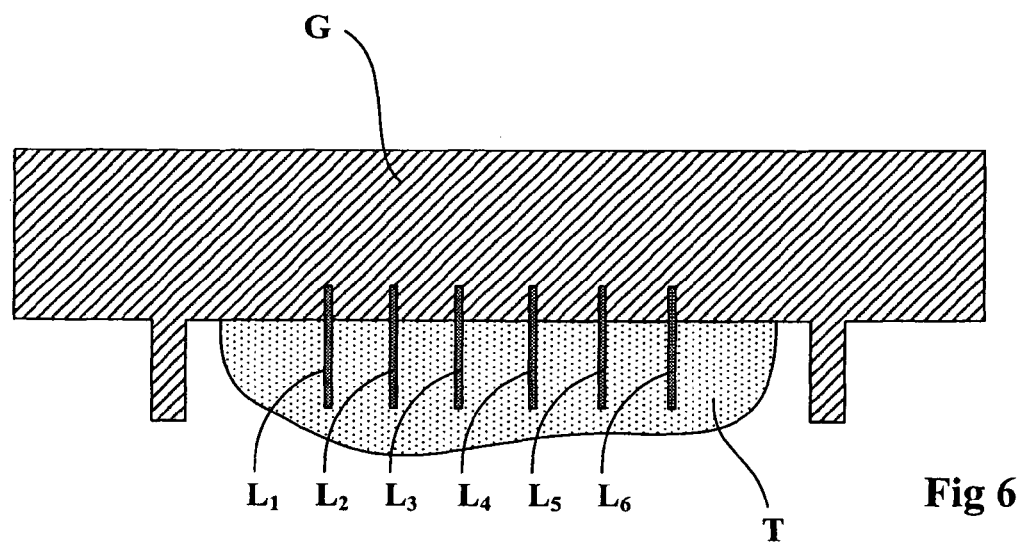
FIG. 6 depicts the schematic front view, in section on BB, of the lining into which a meltable material has been poured.

According to the preferred embodiment of the invention, and in order to prevent the lamella, which have the form of thin partitions, from deforming under the action of the drill and the vibrations, a meltable material T is poured into the empty space between the lamella positioned on the interior side of the lining, and at the point where the lining G is to be drilled, as is illustrated in FIG. 6. Meltable materials suitable for the above-mentioned use are known in the trade by the generic name Cerocast.

Figure 7:
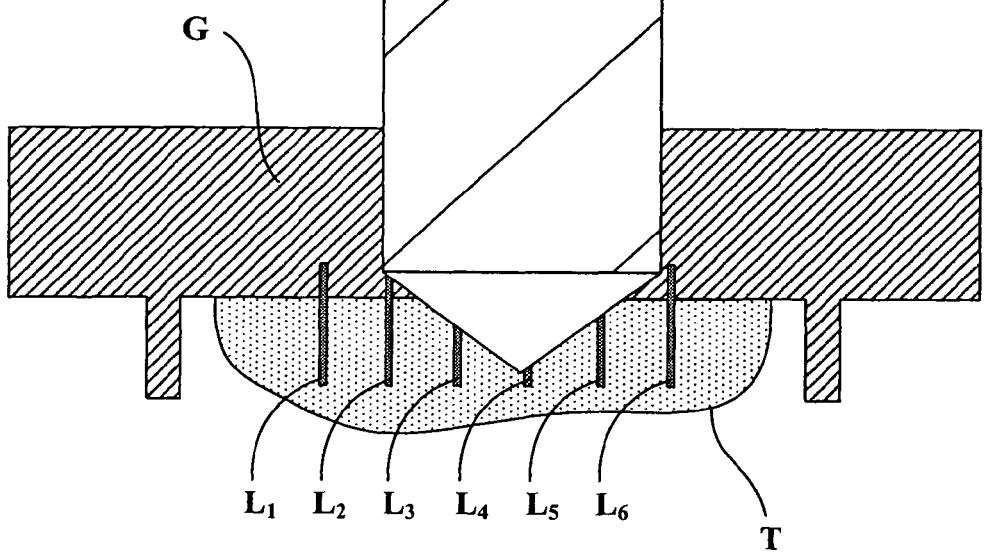
FIG. 7 depicts the schematic front view, in section on BB, of the step of drilling the lining.

Once this operation has been performed, and having waited for meltable material to have set to its maximum hardness, the lining G is drilled by moving a one-piece drill F of given diameter in the radial direction from the outside of the lining towards the inside of the lining as indicated by the arrow D in FIG. 7. The drill allows the material of the lining, the meltable material and the lamella contained in a cylindrical space to be cleared away, as depicted in FIG. 8.

Figure 8:
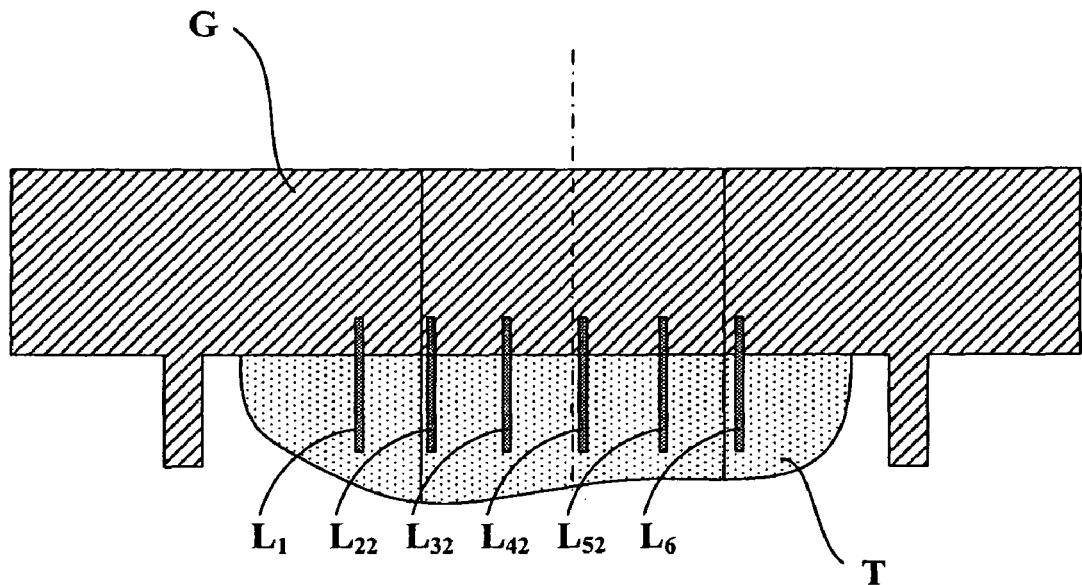
FIG. 8 depicts the schematic front view, in section on BB, of the part of the lining after drilling.

The lamella elements situated in the path of the drill have been removed and the lamella from rows 2, 3, 4 and 5 are split into two parts in such a way that the lamella $L_{22}, L_{32}, L_{42}$ and $L_{52}$ can now be seen in the schematic sectioned view of FIG. 8.

It is then necessary to remove the meltable material T by applying enough heat to melt away the remainder of this material present on the lining G.

Figure 9:
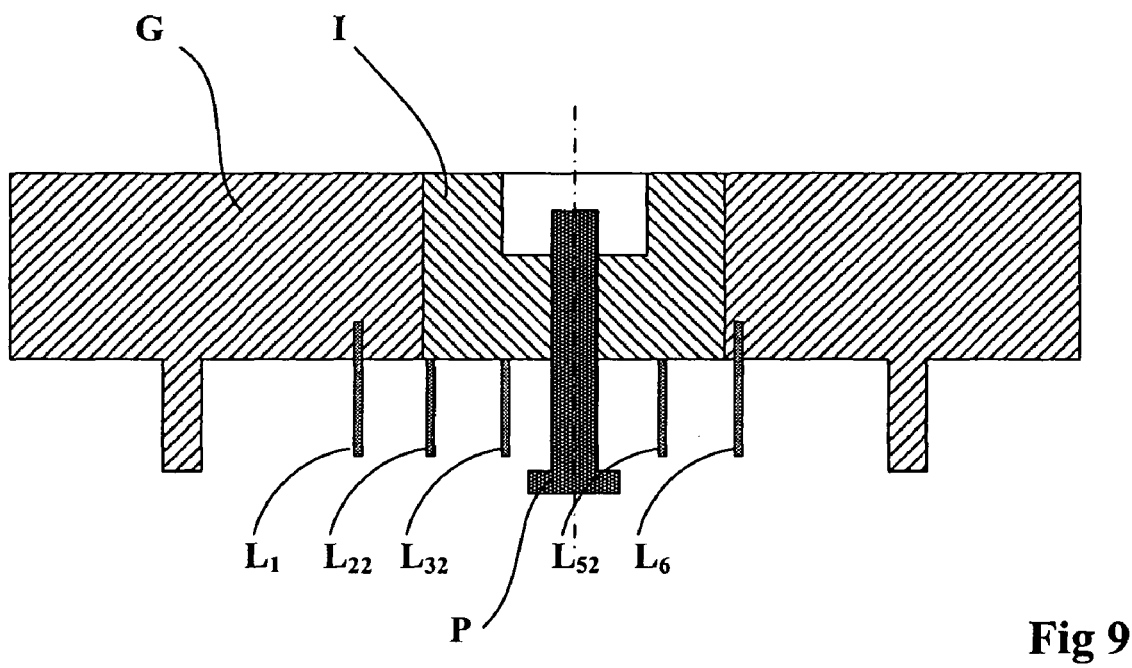
FIG. 9 depicts the part of the lining in which an insert supporting a pin has been positioned.

The final step, illustrated in FIG. 9, is to position an insert I in the hole cleared by the drill in the previous step. The diameter of the drill determines the diameter of the insert I that needs to be introduced. The insert is fixed into the lining preferably by screwing the body of the insert into a suitable screw thread produced beforehand in the lining.

Figure 2:
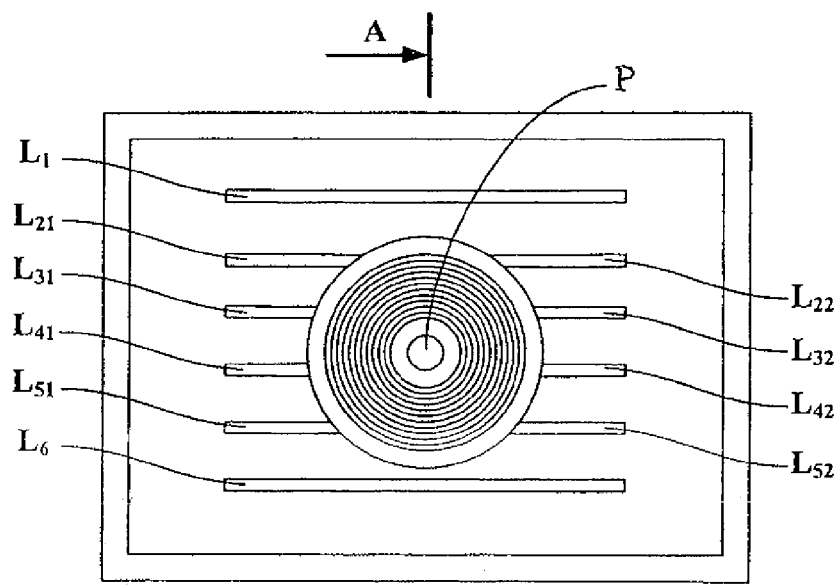
FIG. 2 depicts a view from above of that part of the lining illustrated in FIG. 1.

It will be seen that this sectioned view that is FIG. 9 is the view in section on AA of FIG. 2.

The insert supports a pin P. The said pin may be fixed to the insert by screwing, push-fitting or any other equivalent means that provides a firm connection between the pin and the insert.

It will be appreciated that making the insert removable makes maintenance operations on the mould lining easier, particularly when the pin needs to be replaced because it has become worn or when, for some reason or another, the pin breaks.

Figure 3:
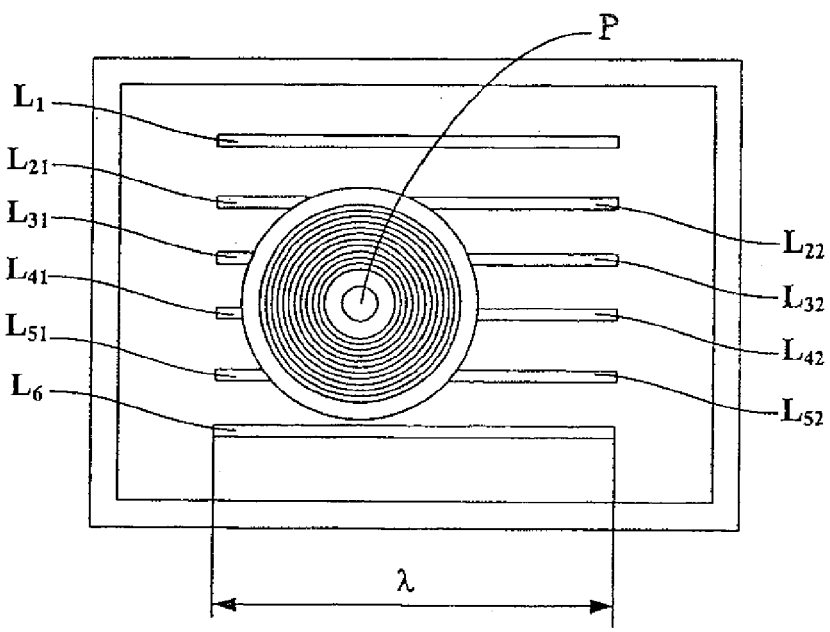
FIG. 3 depicts the view from above of that same part of the lining in which the site of the pin has been changed.

It is also possible to mark patterns on the surface of the insert in order to satisfy specific requirements of an aesthetic nature (as is illustrated in FIGS. 1 to 3) or technical nature such as, for example, to indicate the details of what stud to use.

The invention claimed is:

1. A method for producing a mould lining (G) intended for the manufacture of tires comprising tread blocks that have incisions in them, comprising the steps of:
   producing a mould lining by positioning lamella (L1, L2, L3, L4, L5, L6) of substantially equivalent shape and length λ on parts of the lining that are intended to mould blocks of a tread;
   removing radially, by drilling, the material of the lining (G) and of the lamella (L1, L2, L3, L4, L5, L6) contained in a cylindrical space located at each of sites intended to accept pins (P) capable of moulding housings for studs in the blocks of the tread; and positioning an insert (I) in the hole in the lining (G) obtained by said drilling, wherein before drilling is performed, a meltable material (T) that can be melted after said drilling has been performed, is poured between the lamella positioned on the interior side of the lining (G) and at the point where the drilling is to be made.

2. The method according to claim 1, wherein the hole is made by drilling from the outside of the lining (G) towards the inside of the lining.

3. The method according to claim 1, wherein the insert (I) supports a pin (P) intended to mould the housing capable of accepting a stud.

4. The method according to claim 1, wherein the insert (I) is a removable insert so that it can be removed from the lining (G).

5. The method according to claim 1, wherein patterns are marked on that surface of the insert (I) that is positioned radially on the interior side of the lining (G).

* * * * *